US010818419B2

United States Patent
Kohl et al.

(10) Patent No.: US 10,818,419 B2
(45) Date of Patent: Oct. 27, 2020

(54) PTC THERMISTOR ELEMENT

(71) Applicant: Mahle International GmbH, Stuttgart (DE)

(72) Inventors: Michael Kohl, Bietigheim-Bissingen (DE); Eric Marlier, Kolbsheim (FR); Stefan Paetzold, Stuttgart (DE); David Rollet, Carspach (FR); Falk Viehrig, Stuttgart (DE); Denis Wiedmann, Wallhausen (DE)

(73) Assignee: MAHLE INTERNATIONAL GMBH (DE)

( * ) Notice: Subject to any disclaimer, the term of this patent is extended or adjusted under 35 U.S.C. 154(b) by 0 days.

(21) Appl. No.: 16/377,986

(22) Filed: Apr. 8, 2019

(65) Prior Publication Data

US 2019/0311825 A1     Oct. 10, 2019

(30) Foreign Application Priority Data

Apr. 9, 2018    (EP) ...................................... 18166317

(51) Int. Cl.
     *H01C 7/02*      (2006.01)
     *H01C 17/065*      (2006.01)
     *H05B 3/14*      (2006.01)

(52) U.S. Cl.
     CPC ............. *H01C 7/027* (2013.01); *H01C 7/021* (2013.01); *H01C 7/025* (2013.01); *H01C 17/06533* (2013.01); *H01C 17/06586* (2013.01); *H05B 3/14* (2013.01)

(58) Field of Classification Search
     CPC ........ H01C 7/027; H01C 7/025; H01C 7/021; H01C 17/06533
     See application file for complete search history.

(56) References Cited

U.S. PATENT DOCUMENTS

| | | | | |
|---|---|---|---|---|
| 3,252,061 | A * | 5/1966 | Kepler | H01L 37/00 257/40 |
| 4,544,828 | A * | 10/1985 | Shigenobu | G03G 15/2053 106/228 |
| 5,004,893 | A * | 4/1991 | Westover | H01C 7/022 219/505 |
| 7,382,224 | B2 * | 6/2008 | Wang | H01C 7/027 219/548 |
| 8,653,932 | B2 * | 2/2014 | Yang | H01B 1/20 338/22 R |

(Continued)

FOREIGN PATENT DOCUMENTS

EP      0104673 A3      3/1985

OTHER PUBLICATIONS

A. Franco Jr. et al., Thermal Conductiviity of Polycrystalline Aluminum Nitride (AlN) Ceramics, Center for Ceramic Research, 2004, pp. 247-0253.

*Primary Examiner* — Kyung S Lee
(74) *Attorney, Agent, or Firm* — Fishman Stewart PLLC

(57) ABSTRACT

A PTC thermistor element for a tempering device may include a main body, which may have a positive temperature coefficient. The main body may have PTC thermistor components, a core, and ceramics components at least in the core. The PTC thermistor components may have a positive temperature coefficient, and the ceramics components may have a thermal conductivity of at least 2.5 W/mK. The ceramics components may be disposed in a distributed manner.

20 Claims, 3 Drawing Sheets

(56) References Cited

U.S. PATENT DOCUMENTS

2007/0258865 A1* 11/2007 Yamasaki ........... A01M 1/2033
422/124
2012/0177864 A1 7/2012 Limbeck et al.
2014/0327513 A1* 11/2014 Yang ..................... H01C 7/028
338/22 R

* cited by examiner

PTC THERMISTOR ELEMENT

CROSS-REFERENCE TO RELATED APPLICATION

This application claims priority to European Patent Application No. 18166317.0, filed Apr. 9, 2018, which is hereby incorporated by reference in its entirety.

TECHNICAL FIELD

The present invention relates to a PTC thermistor element for a tempering device. The invention furthermore relates to a method for producing such a PTC thermistor element and to a PTC thermistor module having a plurality of such PTC thermistor elements. The invention furthermore relates to a tempering device having such a PTC thermistor module.

BACKGROUND

PTC thermistor elements, also referred to as PTC elements, have a positive temperature coefficient and are usually used in tempering devices for heating an object or a fluid. In order for such PTC thermistor elements to be operated, an electrical supply which is usually provided by electrical lines, in particular by electrodes, which electrically contact the PTC thermistor elements and in particular bear on the latter, is required. The positive temperature coefficient of the PTC thermistor elements, that is to say the electrical resistance of the PTC thermistor element that increases as the temperature rises, leads to said PTC thermistor elements developing and dissipating heat when an electrical current flows, said heat being used for said heating. So-called barrier layers which, when in operation, develop an extremely high electrical resistance and thus do not permit any electrical current flow, or significantly restrict the latter, are known in PTC thermistor elements. Barrier layers of this type thus lead directly to a lower development of heat within the PTC thermistor element and thus to a reduced efficiency of the PTC thermistor element.

SUMMARY

The present invention is thus based on the object of specifying improved or at least alternative embodiments for a PTC thermistor element of the type mentioned at the outset, for a method for producing such a PTC thermistor element, for a PTC thermistor module having a plurality of such PTC thermistor elements, and for a tempering device having at least one PTC thermistor module of this type, said improved or at least alternative embodiments being distinguished in particular by an enhanced efficiency of the respective PTC thermistor element.

This object is achieved according to the invention by the subject matter of the independent claims. Advantageous embodiments are the subject matter of the dependent claims.

The present invention is based on the general concept of providing in a PTC thermistor element, apart from components which ensure the positive temperature coefficient that is specific to the PTC thermistor element, also such components which in comparison to the PTC thermistor components have an increased thermal conductivity, wherein these components are disposed in a distributed manner in the PTC thermistor element. The components present, having the increased thermal conductivity, ensure an improved heat transmission within the PTC thermistor element, in particular toward the external sides or surfaces, respectively, of the PTC thermistor element. This prevents the configuration of so-called barrier layers, or at least leads to less pronounced barrier layers, which in the operation of the PTC thermistor element have an electrical resistance that is higher as compared to neighbouring regions, such that said barrier layers prevent the flow of the electrical current or at least significantly reduce the latter. The knowledge that barrier layers of this type, by virtue of the positive temperature coefficient, arise in regions of increased temperature is utilized herein. The improved heat transmission within the PTC thermistor element thus ensures that such regions are avoided or arise at least in a less pronounced manner. The improved heat transmission within the PTC thermistor, and the prevention or at least reduction of barrier layers, consequently lead to an enhanced efficiency of the PTC thermistor element.

According to the concept of the invention, the PTC thermistor element has a main body which has a positive temperature coefficient. This means that the main body in its entirety has an electrical resistance that increases as the temperature rises. It is provided according to the invention herein that the main body has proportions or components which ensure the positive temperature coefficient, wherein these components hereunder are also referred to as PTC thermistor components. Moreover, the main body, at least in the core thereof, has proportions or components, respectively, which have an increased thermal conductivity as compared to the PTC thermistor components, wherein said components are ceramic and hereunder are referred to as ceramics components. Provided are ceramics components which have a thermal conductivity of at least 3 W/mK. The PTC thermistor components and the ceramics components herein are disposed in a distributed manner in the main body, in particular in the core of the main body.

The ceramics components are expediently electrically isolating. The respective ceramics component therefore in particular has a specific electrical resistance of at least $10^8$ Ω·cm The electrically isolating property of the ceramics components in particular leads to said ceramics components being used substantially exclusively for the heat transmission within the PTC thermistor element, and thus to not having any or at least a reduced influence on the positive temperature coefficient of the PTC thermistor element.

Embodiments in which the PTC thermistor components and the ceramics components are distributed, particularly preferably in a uniform manner, in the entire main body are preferred. An improved heat transmission within the PTC thermistor element is possible on account thereof, said improved heat transmission leading to an advantageous increase in the efficiency of the PTC thermistor element. Moreover, it is thus possible for the PTC thermistor element to be produced in a simplified manner.

Embodiments in which the main body has a microstructure composed of the PTC thermistor components and of the ceramics components, in particular in which the main body is such a microstructure, have proven advantageous. This means in particular that the ceramics components are embedded in the PTC thermistor components, or vice versa.

In principle, the respective PTC thermistor component and ceramics component can have any arbitrary shape and size. Embodiments in which the components are in each case configured as parts, wherein these parts are mutually adjacent and can mix in the interface regions are preferred. Accordingly, the main body has PTC thermistor parts having the positive temperature coefficient, and ceramics parts having the increased thermal conductivity, said PTC thermistor parts and ceramics parts being disposed in a distributed manner. The PTC thermistor parts and the ceramics parts are mutually adjacent and can mix in the interface regions.

Embodiments in which the respective PTC thermistor component, or the respective PTC thermistor part, respectively, and/or the respective ceramics component and/or the respective ceramics part, respectively, are configured in the manner of granules or islets are preferred. This means that the main body can have islets or granules from the PTC thermistor components, and islets or granules from the ceramics components, said islets or granules being disposed in a distributed manner in the main body, in particular in the core of the main body.

Embodiments in which the electrical resistance of the respective PTC thermistor component has a profile that sharply increases as the temperature rises are advantageous. Embodiments in which the respective PTC thermistor component has an electrical resistance which has a temperature-dependent characteristic are preferred. Embodiments in which the respective PTC thermistor component has an electrical resistance which in a temperature-dependent manner runs exponentially are particularly preferred. Of course, embodiments in which PTC thermistor components have dissimilar temperature-dependent profiles of the electrical resistance may also be provided.

Embodiments in which the ceramics components have in each case a thermal conductivity of at least 3 W/mK prove advantageous. Embodiments in which the ceramics components have in each case a thermal conductivity of at least 6 W/mK, particularly preferably a thermal conductivity of at least 20 W/mK, are preferred. For example, the ceramics components can have in each case a thermal conductivity between 6 W/mK and 300 W/mK, in particular between 20 W/mK and 300 W/mK. On account thereof, an improved and increased heat transmission within the PTC thermistor element and thus an increase in the efficiency of the PTC thermistor element take place.

In the case of advantageous embodiments, the proportion of the PTC thermistor components in the main body is greater than the proportion of the ceramics components in the main body. An advantageous combination of the required PTC thermistor properties and the improved thermal conductivity can thus be achieved in the PTC thermistor element.

In principle, the main body of the PTC thermistor element can have any arbitrary shape and/or size. The main body can be configured so as to be cuboid, for example.

In principle, the main body can be produced in any arbitrary manner.

Embodiments in which the main body is sintered from a mixture that comprises the PTC thermistor components and the ceramics components are advantageous. On account thereof, the main body can be produced in a cost-effective, efficient and high-quality manner.

Moreover, sintering, which is already known in the case of PTC thermistor elements, is therefore used for producing the PTC thermistor element such that the use of new tools and the like is avoided or at least minimized.

It is preferable herein for the PTC thermistor components and the ceramics components to be present in the mixture as a powder and/or as granules, and to be subsequently sintered. It is moreover advantageous for the PTC thermistor components and the ceramics components to be disposed so as to be already distributed, in particular in a uniform manner, in the mixture.

In principle, the respective PTC thermistor component can be produced from any arbitrary material or any arbitrary composition. The respective PTC thermistor component can in particular be silicon-based, in particular comprise doped silicon or be composed of the latter.

Embodiments in which the respective PTC thermistor component is based on barium titanate, in particular comprises barium titanate or is composed of the latter are preferred. The PTC thermistor element can be produced in a simplified manner on account thereof. Moreover, the PTC thermistor element on account thereof has a heavily temperature-dependent electrical resistance, in particular an electrical resistance which increases exponentially as the temperature rises, such that the PTC thermistor properties of the PTC thermistor element are intensely pronounced despite the presence of the ceramics components. The main body can in particular be a mixed ceramic.

The respective ceramics component is ceramic wherein, in principle, arbitrary ceramics can be used. Ceramics of this type, apart from the advantageous thermal conductivity, have a largely electrically isolating property of the type mentioned. Moreover, ceramics of this type can be used in a simplified manner for producing the PTC thermistor element.

In the case of preferred embodiments, the ceramics components comprise in each case aluminium nitride and/or boron nitride and/or aluminium oxide. In particular, the respective ceramics component can be composed of aluminium nitride and/or boron nitride and/or aluminium oxide. Advantageous embodiments provide that the PTC thermistor components are composed of barium titanate, and the ceramics components are composed of aluminium nitride.

In order for the PTC thermistor element to be sintered from the mixture, the respective PTC thermistor components and the ceramics components can first be provided and subsequently be mixed to form the mixture. Sintering of the mixture for producing the PTC thermistor element is performed thereafter, wherein an in particular uniform distribution of the ceramics components and of the PTC thermistor components in the mixture is advantageously already present.

In preferred embodiments at least a part, preferably all, of the ceramic components are configured to have an island, in particular an islet, or a granulate shape within the main body, in particular, within the core. That is, the main body, in particular the core, comprises a structure that comprises islands, in particular islets, and/or granulates, with the island, in particular islets, and/or granulates being or being made of the ceramic components.

In addition or as an alternative at least a part, preferably all, of the thermistor components can be configured to have an island, in particular an islet, and/or a granulate shape within the main body, in particular, in the core. That is the main body, in particular the core can have an structure that comprises islands, in particular islets, and/or granulates, with the islands, in particular islets, and/or the granulates being or being made of the thermistor components.

The main body, in particular the core, can thus have an allover islands, in particular islets, and/or granulates structure with each island, in particular islet, and/or granulate being a or being made of either the ceramic component or the thermistor component.

In principle, the PTC thermistor module can be used in any arbitrary application. The use of the PTC thermistor element is conceivable in a tempering device in which the PTC thermistor element, when in operation, heats an object or a fluid.

A plurality of the PTC thermistor elements herein can be combined in one PTC thermistor module in which the PTC thermistor elements are disposed so as to be mutually spaced apart. The module, apart from the PTC thermistor elements, has two electrical lines for the electrical supply to the PTC thermistor elements, wherein the lines electrically contact the PTC thermistor elements. The lines can in each case be present as one electrode and/or bear directly on the respective PTC thermistor element. The lines are expediently disposed so as to be mutually spaced apart in such a manner that, when in operation, an electrical current flows through the respective PTC thermistor element and thus leads to heat being generated within the respective PTC thermistor element, said heat being used for heating objects and fluids.

The PTC thermistor module moreover can have at least one thermal conduction plate which extends along the PTC thermistor elements. The thermal conduction plate herein contacts, preferably directly, the PTC thermistor elements in a heat-exchanging manner. It is moreover advantageous for the thermal conduction plate to be electrically isolating, in particular to have a specific electrical resistance of at least $10^8$ Ω·cm. Embodiments in which the PTC thermistor module has two such thermal conduction plates which are disposed so as to be mutually spaced apart, in particular opposite one another, and extend along the PTC thermistor elements, are also conceivable, wherein the respective thermal conduction plate contacts, preferably directly, the PTC thermistor elements in a heat-exchanging manner.

It is understood that, apart from the PTC thermistor element, from the method for producing the PTC thermistor element, and from the PTC thermistor module, a tempering device having at least one such PTC thermistor module is also within the scope of this invention.

Such a tempering device is used in particular in a motor vehicle and serves for tempering, that is in particular heating, an object or a fluid.

It is conceivable herein that a fluid to be tempered flows through a flow chamber of the tempering device, wherein the respective PTC thermistor module contacts the fluid flowing through the flow chamber in a heat-exchanging manner. To this end, the PTC thermistor module can be disposed within the flow chamber. It is also conceivable for the PTC thermistor module to be disposed outside the flow chamber, in particular so as to contact in a heat-exchanging manner a tubular body that delimits the flow chamber, for example so as to bear on the tubular body.

The tempering device can be an auxiliary heater which, when in operation, is flown through by air and heats the air with the aid of the at least one PTC thermistor module.

Tempering devices which have a circuit in which a tempering fluid circulates are also conceivable, wherein the PTC thermistor module heats the tempering fluid. The tempering fluid can subsequently be used for heating an object and/or another fluid.

Further important features and advantages of the invention are derived from the dependent claims, from the drawings, and from the associated description of the figures by means of the drawings.

It is understood that the features mentioned above and yet to be explained hereunder, can be applied not only in the respective combination specified but also in other combinations or individually, without departing from the scope of the present invention.

BRIEF DESCRIPTION OF THE DRAWINGS

Preferred exemplary embodiments of the invention are illustrated in the drawings and will be explained in more detail in the description hereunder, wherein the same reference signs refer to the same, or to similar, or to functionally equivalent components.

In the drawings, in each case in a schematic manner.

DETAILED DESCRIPTION

Figure 1:
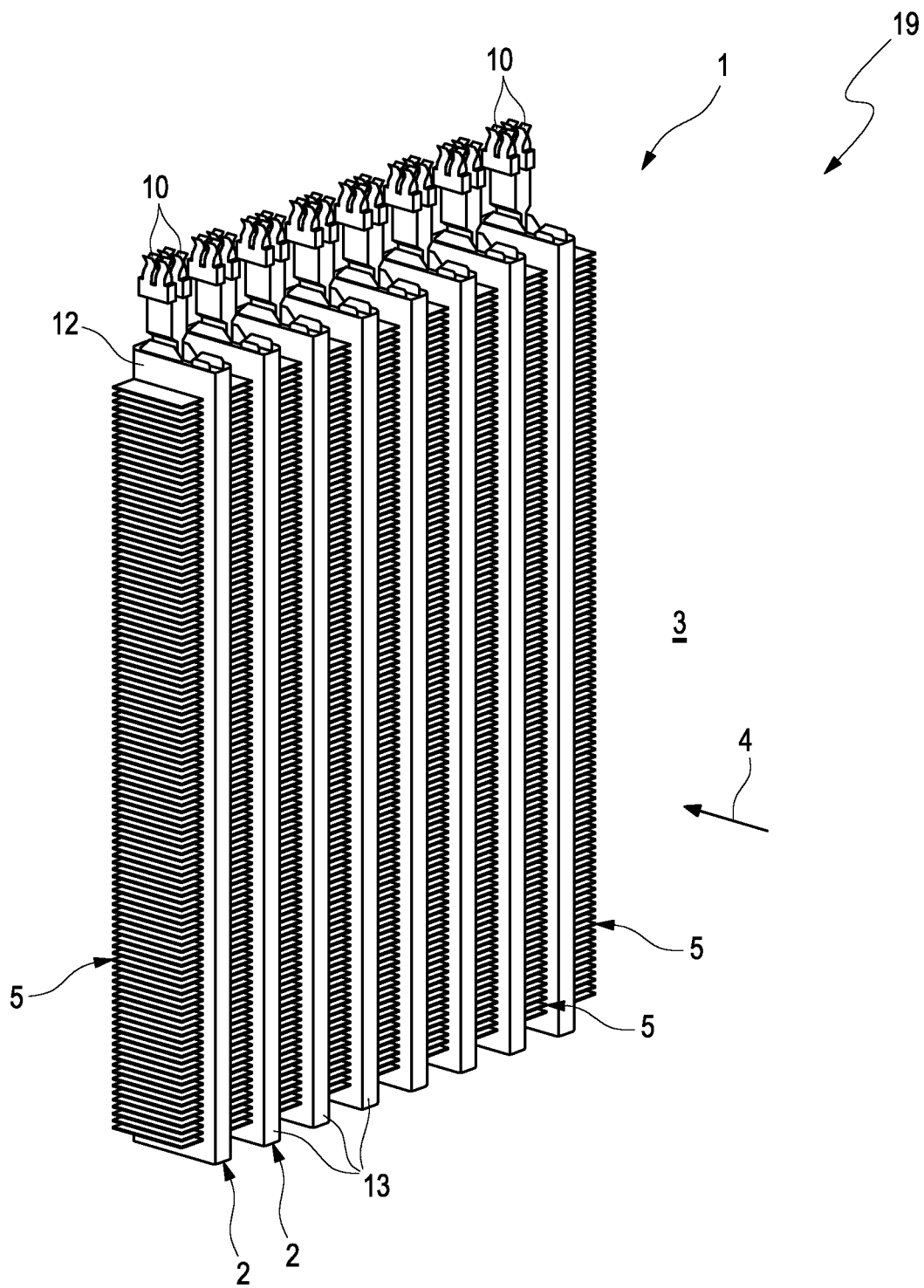
FIG. 1 shows an isometric internal view of a tempering device having PTC thermistor modules.

A tempering device 1 such as is shown in FIG. 1, for example, has at least one PTC thermistor module 2 by way of which the tempering device heats a fluid or an object (not shown). In the case of the example shown in FIG. 1, the tempering device 1 has a plurality of PTC thermistor modules 2 which are disposed so as to be mutually spaced apart. The PTC thermistor modules 2 herein are disposed in a flow chamber 3 through which a flow path 4 of a fluid, for example air, passes, wherein the PTC thermistor modules 2 are disposed in the flow path 4 in such a manner that the fluid flows around said PTC thermistor modules 2, when in operation, the fluid being heated by said PTC thermistor modules 2. Rib structures 5 flown through by the fluid are provided between the PTC thermistor modules 2 and increase a heat exchange between the PTC thermistor modules 2 and the fluid.

Figure 2:
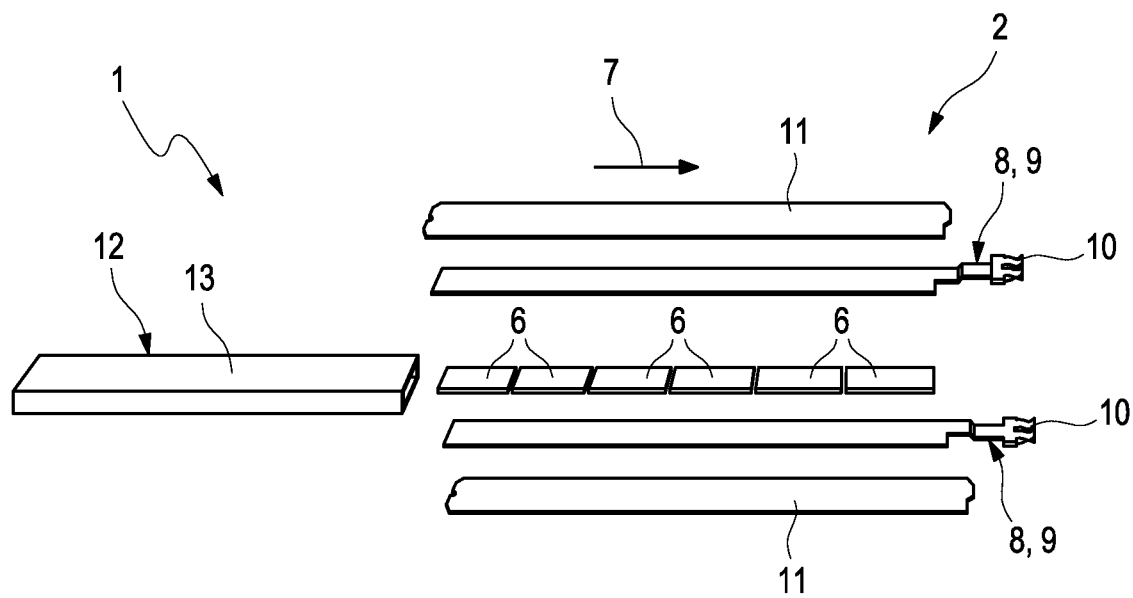
FIG. 2 shows an exploded illustration of a PTC thermistor module.
Figure 3:
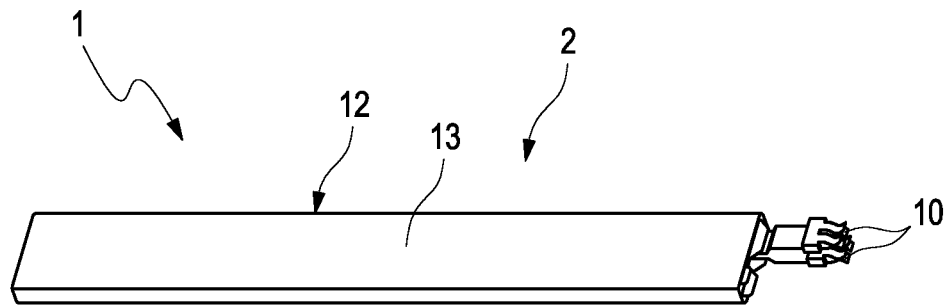
FIG. 3 shows an isometric view of the PTC thermistor module from FIG. 2.
Figure 4:
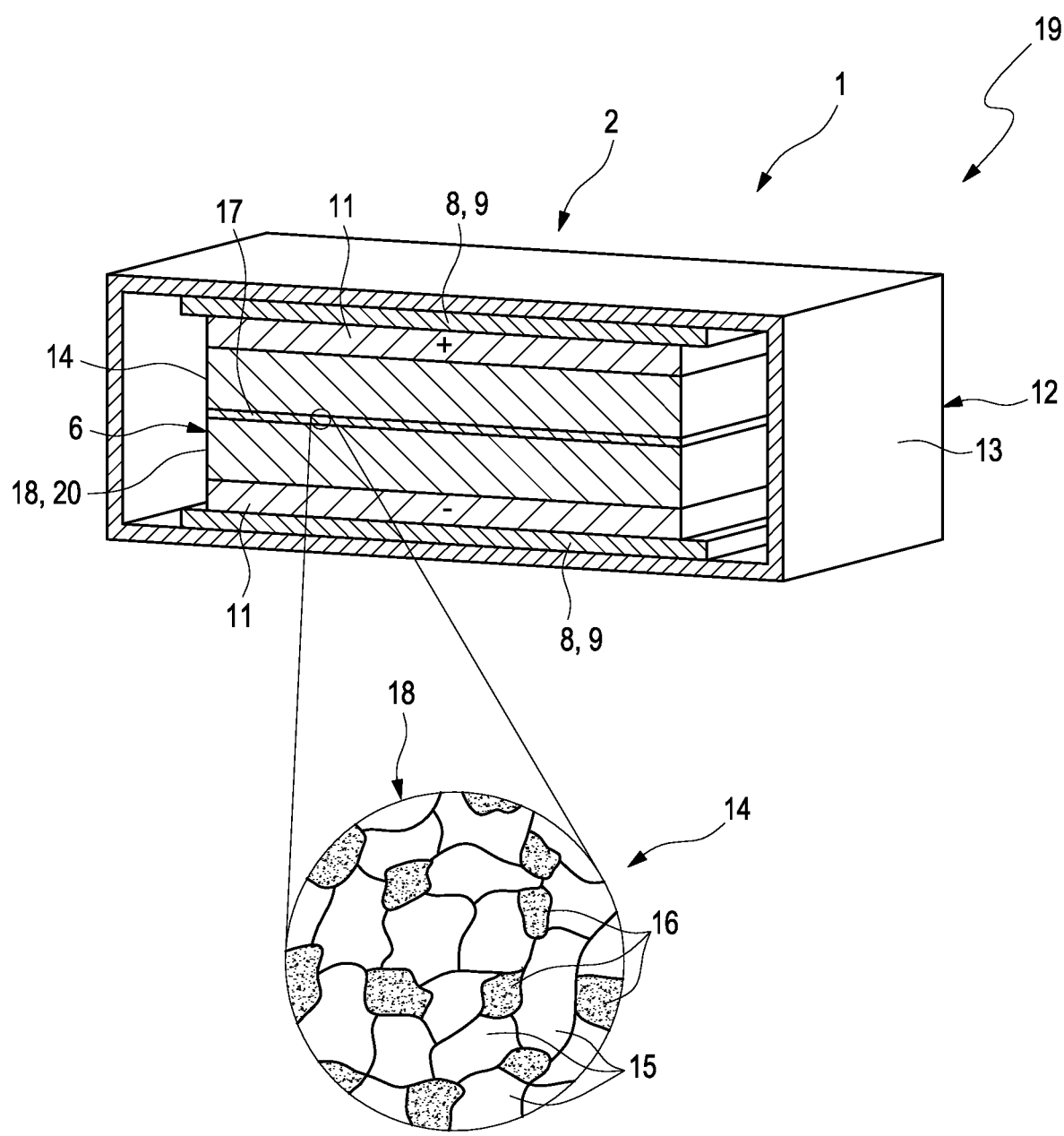
FIG. 4 shows an isometric section through the PTC thermistor module in the region of a PTC thermistor element.

An example of such a PTC thermistor module 2 is shown in FIGS. 2 to 4, wherein FIG. 2 shows an exploded illustration of the PTC thermistor module 2, FIG. 3 shows an isometric view of the PTC thermistor module 2, and FIG. 4 shows an isometric section through the PTC thermistor module 2 in the region of a PTC thermistor element 6.

The PTC thermistor module 2 for generating heat has a plurality of PTC thermistor elements 6, also referred to as PTC elements 6, which in a direction of extent 7 of the PTC thermistor module 2 are disposed so as to be mutually spaced apart. The PTC thermistor elements 6, when in operation, are supplied with electricity. To this extent, the PTC thermistor module 2 has two electrical lines 8 which are in each case configured as an electrode 9. The lines 8 extend in the direction of extent 7 and are disposed opposite one another in such a manner that the PTC thermistor elements 6 are disposed between the lines 8. The respective line 8 herein electrically contacts the PTC thermistor elements 6, in particular bearing on the PTC thermistor elements 6. Moreover, the respective line 8 for connecting the PTC thermistor module 2 to an electrical supply (not shown) has a connector 10. When an electrical voltage is applied to the lines 8, an electrical current flows through the PTC thermistor elements 6 which have a positive temperature coefficient, that is to say having electrical resistance that, preferably exponentially, increases as the temperature rises. On account thereof, heat which is used for heating within the tempering device 1, for example the fluid, is generated in the PTC thermistor elements 6. For transmitting the heat of the PTC thermistor elements 6 the PTC thermistor module 2 has two thermal conductor plates 11 which extend in the direction of extent 7 and are mutually spaced apart in such a manner that the PTC thermistor elements 6 are disposed between the thermal conductor plates 11. The lines 8 in the example shown are also disposed between the thermal conductor plates 11. The respective thermal conductor plate 11 herein contacts the adjacent line 8 in a heat-exchanging manner, in particular bearing on the line 8. The respective thermal conductor plate 11 is electrically isolating and has a high thermal conductivity, preferably being a ceramics plate which has a thermal conductivity of at least 3 W/mK and a specific electrical resistance of at least $10^8$ Ω·cm. The lines 8 are produced from a metal, or from a metal-containing composition, having a high thermal conductivity. The PTC thermistor module 2 moreover has a sheathing element 12 which forms an external contour 13 of the PTC thermistor module 2, the connectors 10 of the lines 8 protruding at the end side from said sheathing element 12. The sheathing element 12 is preferably produced from a metal, or from a metal-containing composition, having a high thermal conductivity. The rib structures 5 in the tempering device 1 shown in FIG. 1 herein bear on the sheathing element 12 of the respective PTC thermistor module 2.

As can be derived in particular from FIG. 4, the PTC thermistor element 6 has a main body 14 which electrically contacts the lines 8, the lines 8 in particular bearing on said main body 14. Moreover, an enlarged detailed view of the main body 14 can be derived from FIG. 4. It can be seen here that the main body 14 comprises PTC thermistor components 15 and ceramics components 16 which are, preferably uniformly, distributed in the main body 14. The main body 14 is preferably composed of the PTC thermistor components 15 and of the ceramics components 16. The PTC thermistor components 15 have a positive temperature coefficient and ensure the positive temperature coefficient of the main body 14 and of the PTC thermistor element 6. This means that the electrical resistance of the PTC thermistor components 15 increases, in particular by way of an exponential profile, as the temperature rises. The ceramics components 16 have a thermal conductivity that is increased in comparison to the PTC thermistor components 15, said ceramics components 16 being electrically isolating. The ceramics components 16 preferably have a specific electrical resistance of $10^8$ Ω·cm and a thermal conductivity of at least 3 W/mK, preferably of at least 6 W/mK, preferably at least 20 W/mK, in particular between 20 W/mK and 300 W/mK. On account thereof, the main body 14 and thus the PTC thermistor element 6, apart from the positive temperature coefficient that is required for the operation of the PTC thermistor element 6, has an improved thermal conductivity within the PTC thermistor element 6, said improved thermal conductivity being caused by the ceramics components 16 and leading to heat being able to be transported in an improved manner from the interior, in particular from a core 17 of the main body 14 or of the PTC thermistor element 6, respectively, to the surfaces of the PTC thermistor element 6 and thus to the lines 8 and to the heating plates 11. On account thereof, in particular the formation of so-called barrier layers within the main body 14, in particular in the core 17, is prevented or at least reduced, such that the efficiency of the PTC thermistor element 6 can be further enhanced.

It can be furthermore derived from the enlarged illustration in FIG. 4 that the main body 14 is a microstructure 20 in which the PTC thermistor components 15 and the ceramics components 16 are configured or formed, respectively, in the manner of islets or granules, respectively, and are disposed in a distributed manner. The ceramics components 16 herein are advantageously embedded in the PTC thermistor components 15.

The PTC thermistor components 15 preferably have in each case barium titanate, are in particular composed of barium titanate. The ceramics components 16 are preferably composed of a ceramic, for example of aluminium nitride, boron nitride, or aluminium oxide, or mixtures therefrom. The main body 14 can thus be composed of PTC thermistor components 15 which are composed of barium titanate, and of ceramics components 16 which are composed of aluminium nitride. The main body 14 is thus a mixed ceramic 18. The ceramics components 16 and the PTC thermistor components 15 herein are preferably disposed uniformly in a distributed manner in the main body 14.

The PTC thermistor element 6 and thus the main body 14 are preferably produced by a sintering method. To this end, the PTC thermistor components 15 and the ceramics components 16, for example in the form of powders or granules, are first provided and mixed with one another, wherein this mixture is subsequently sintered for the production of the PTC thermistor element 6.

The PTC thermistor elements 6, or the PTC thermistor modules 2, respectively, can be used in a tempering device 1 of an arbitrary application, for example in a vehicle 19 (not shown in more detail).

The invention claimed is:

1. A PTC thermistor element for a tempering device, comprising a main body, which has a positive temperature coefficient, the main body having PTC thermistor components, a core, and ceramics components at least in the core;
    wherein the PTC thermistor components have a positive temperature coefficient, and the ceramics components have a thermal conductivity of at least 2.5 W/mK, the ceramics components being disposed in a distributed manner; and
    wherein at least a part of the ceramic components have an island or an granulate shape.

2. The PTC thermistor element according to claim 1, wherein an electrical resistance of each PTC thermistor component has a temperature-dependent profile that is one of linear or exponential.

3. The PTC thermistor element according to claim 1, wherein the thermal conductivity of the ceramics components is at least 3 W/mK.

4. The PTC thermistor element according to claim 3, wherein the thermal conductivity of the ceramics components is between 6 W/mK and 300 W/mK.

5. The PTC thermistor element according to claim 1, wherein a proportion of the PTC thermistor components in the main body is greater than a proportion of the ceramics components in the main body.

6. The PTC thermistor element according to claim 1, wherein the main body is a microstructure that includes the PTC thermistor components and the ceramics components.

7. The PTC thermistor element according to claim 1, wherein the main body is sintered from a mixture that includes the PTC thermistor components and the ceramics components.

8. The PTC thermistor element according to claim 1, wherein the PTC thermistor components include barium titanate.

9. The PTC thermistor element according to claim 1, wherein the ceramics components include at least one of aluminium nitride, boron nitride, and aluminium oxide.

10. The PTC thermistor element according to claim 9, wherein the ceramics components are composed of aluminium nitride.

11. The PTC thermistor element according to claim 9, wherein the ceramics components are composed of boron nitride.

12. The PTC thermistor element according to claim 9, wherein the ceramics components are composed of aluminium oxide.

13. The PTC thermistor element according to claim 1, wherein at least a part of the PTC thermistor components have one of an island shape or a granulate shape.

14. A method for producing a PTC thermistor element, comprising:
providing PTC thermistor components and ceramics components;
mixing the PTC thermistor components and the ceramics components to produce a mixture; and
sintering the mixture to produce the PTC thermistor element;
wherein the PTC thermistor components have a positive temperature coefficient, and the ceramics components have a thermal conductivity of at least 2.5 W/mK, the ceramics components being disposed in a distributed manner; and
wherein the ceramics components are provided as granules.

15. The method according to claim 14, wherein the PTC thermistor components are provided as granules.

16. A PTC thermistor module for a tempering device, comprising:
at least two PTC thermistor elements each having a main body, which has a positive temperature coefficient, the main body having PTC thermistor components, a core, and ceramics components at least in the core;
two electrical lines for connecting the PTC thermistor module to an electrical supply;
at least one thermal conduction plate extending along the PTC thermistor elements and in a heat-exchanging relationship with the PTC thermistor elements;
wherein the PTC thermistor components have a positive temperature coefficient, and the ceramics components have a thermal conductivity of at least 2.5 W/mK, the ceramics components being disposed in a distributed manner; and
wherein the PTC thermistor elements are disposed so as to be mutually spaced apart, and the two electrical lines are mutually spaced apart and electrically contact the PTC thermistor elements.

17. The PTC thermistor module according to claim 16, wherein the at least one thermal conduction plate contacts a respective one of the two electrical lines in a heat-exchanging manner.

18. The PTC thermistor module according to claim 16, further comprising a sheath forming an external contour of the PTC thermistor module, the sheath having a rectangular cross section.

19. The PTC thermistor module according to claim 18, wherein the sheath is formed from a metal or a metal-containing component, and the at least one thermal conduction plate is formed from a ceramic.

20. A tempering device for tempering a fluid, comprising:
a flow chamber that, when in operation, is flown through by the fluid; and
at least one PTC thermistor module, which contacts the fluid that flows through flow chamber in a heat-exchanging manner, the at least one PTC thermistor module having:
at least two PTC thermistor elements each having a main body, which has a positive temperature coefficient, the main body having PTC thermistor components, a core, and ceramics components at least in the core; and
two electrical lines for connecting the PTC thermistor module to an electrical supply;
wherein the PTC thermistor components have a positive temperature coefficient, and the ceramics components have a thermal conductivity of at least 2.5 W/mK, the ceramics components being disposed in a distributed manner; and
wherein the PTC thermistor elements are disposed so as to be mutually spaced apart, and the two electrical lines are mutually spaced apart and each electrically contacts each of the PTC thermistor elements.

* * * * *